United States Patent Office 3,272,890
Patented Sept. 13, 1966

3,272,890
COMPATIBLE POLYOLEFIN AND POLY-
URETHANE COMPOSITION
John M. O'Leary, Jr., Wilmington, Del., assignor, by mesne assignments, to Container Corporation of America, Chicago, Ill., a corporation of Delaware
No Drawing. Filed Mar. 4, 1963, Ser. No. 262,362
4 Claims. (Cl. 260—859)

The present invention is directed to a compatible polyolefin and polyurethane composition, and more particularly to a polyolefin and polyurethane blend which may be compression molded and flexed, and which is compatible under working conditions.

Polyolefins have long had utility for containers and other vessels. However, conventional polyolefin containers have suffered from the handicap of possessing a relatively low resistance to hydrocarbons, such as gasoline, benzene, kerosene, and the like. It has long proven desirable to be able to package hydrocarbons in polyolefin containers, but due to this low resistance of the polyolefins to hydrocarbons they have suffered as a packaging material for these types of liquids.

While polyurethanes possess a relatively high degree of resistance to liquid hydrocarbons, it has been thought that they could not be satisfactorily blended with polyolefins. Thus, polyolefins are non-polar materials and require non-polar organic solvents, while polyurethanes are polar materials and require polar organic solvents. Attempts to blend a polyurethane with a polyolefin through the blending of solvent mixtures have proved to be unsatisfactory because of the antipodal nature of the solvents and of the mixtures.

This invention has as an object the provision of a compatible polyolefin and polyurethane composition, and a method of achieving the same.

This invention has as another object the provision of a compatible polyolefin and polyurethane composition which possesses excellent resistance characteristics in the cold state to hydrocarbon solvents, while at the same time possessing the stuctural characteristics of commercial polyolefins.

Other objects will appear hereinafter.

The polyurethane should be present in the composition in less than a major amount, namely bewteen 5 and 50 weight percent, and most preferably between about 15 to about 25 weight percent, with the remainder being the polyolefin (minor amounts of additives may be present). Thus, I have discovered that with the compatible polyolefin-polyurethane compositions of the present invention, where the weight percentage of the polyurethane is below about 15 weight percent, it is inadequate to confer satisfactory resistance properties to attack by hydrocarbon solvents. Where the concentration of the polyurethane exceeds about 25 weight percent in the compatible polyurethane-polyolefin mixture, the mixture cannot be molded to form containers without appreciable difficulty. Within the weight percentage range of from 15 to 25 weight percent of polyurethane, it is possible to obtain a translucent compatible mixture which may be compression molded and flexed, and which possesses excellent resistance characteristics to the action of liquid hydrocarbons, such as gasoline, benzene, toluene, kerosene, naphtha, etc.

The temperature at which the polyolefin is to be heated prior to the blending with the polyurethane is dependent upon the nature of the polyolefin. The temperature is not precisely critical, but optimum ranges may be given. Thus, with low density polyethylene, namely polyethylene having a density of between 0.910 and 0.935, a preferred temperature range is between 210° F. and 240° F.; with high density polyethylene, namely a polyethylene having a density above 0.935, the temperature range is between 255° F. to 285° F.; while with polypropylene, the temperaure range is between 335° F. to 365° F.

By "polyolefin" as used herein is meant a polyethylene, or polypropylene, or a polyethylene or polypropylene copolymer in which a major weight percentage of the copolymer constitutes either polyethylene or polypropylene, or mixtures of a polyethylene or polypropylene and one of the aforesaid copolymers. By way of example of a copolymer which may be utilized in the present invention is the copolymer of ethylene and ethyl acrylate having a major weight percentage of polyethylene, and which is designated as DPD-6169. The physical properties of DPD-6169 (obtained on compression-molded plaques unless otherwise indicated) is as follows:

| Property | ASTM Test Method | DPD-6169 |
|---|---|---|
| Melt Index (gms./10 min.) | D1238-52T | 6 |
| Density (gms./cc.) | D1505-57T | 0.931 |
| Vicat Softening Temperature (° C.) | D1525-58T | 64 |
| Hardness | D676-55T | |
| Durometer, Shore A | | 86 |
| Durometer, Shore D | | 27 |
| Compression Set | D395-55B | |
| After 9 days at 23° C. (percent recovery) | | 56 |
| After 22 hrs. at 70° C. (percent recovery) | | 18 |
| Tensile Strength (p.s.i.) | D412-51T | 1,350 |
| Elongation | D412-51T | 650 |
| Brittleness Index | D746-55T | |
| 50% O.K. (° C.) | | >−105 |
| 80% O.K. (° C.) | | −100 |
| Environmental Stress-Crack Resistance | D1693-59T | |
| $F_0$ (hours) | | >500 |
| $F_{50}$ (hours) | | >500 |
| Flex-Cracking Resistance | Ross Rubber Test Apparatus | |
| at 25° C. (Cycles to Fail) | | >2,000,000 |
| at 0° C. (Cycles to Fail) | | >2,000,000 |

I have discovered that a polyolefin and polyurethane may be satisfactorily blended to form a compatible composition if the polyolefin is first melted and brought to a flux in a Banbury mixer, and the polyurethane added to the molten polyolefin. I have discovered that if the mixture is subjected to agitation within the Banbury mixer for an appreciable time period, such as on the order of three minutes, the polyurethane will enter into solution, without the need for solvents.

I have prepared compatible compositions of polyolefin and polyurethane throughout the entire weight percentage range of between 5 weight percent and 50 weight percent of polyurethane, and have prepared these mixtures at 5 weight percent intervals within this range. The final compositions are compatible throughout this entire range, and in its broadest compass the subject invention embraces compositions containing between 5 weight percent and 50 weight percent of polyurethane. However, as above-indicated, those compositions having between 15 weight percent and 25 weight percent of polyurethane are to be preferred, since satisfactory resistance to liquid hydrocarbon solvents cannot be achieved with compositions in which the polyurethane is below about 15 weight percent, and satisfactory molding characteristics cannot be achieved where the polyurethane is present in an amount greater than 25 weight percent.

Due to the higher crystallinity of high density polyethylene and polypropylene, it is more difficult to prepare compatible polyurethane-polyolefin compositions containing high weight percentages of polyurethane with high density polyethylene or with polypropylene.

As examples of polyolefins which have been used in the present invention, may be mentioned the following materials: DPD-6169; Alathon 10, a polyethylene having a density of 0.923 and a melt index of 2.1; Alathon 14, a polyethylene having a density of 0.914 and a melt index of 1.8; Alathon 16, a polyethylene having a density of 0.923 and a melt index of 4.0; Alathon 20, a polyethylene having a density of 0.921 and a melt index of 2.1; Alathon 22, a polyethylene having a density of 0.921 and a melt index of 3.0; Alathon 34, a polyethylene having a density of 0.930 and a melt index of 3.0; Marlex 3328, a polyethylene having a density of 0.933 and a melt index of 2.8; Marlex 6002, a polyethylene having a density of 0.960 and a melt index of 0.2; Marlex 6009, a polyethylene having a density of 0.96 and a melt index of 0.9; Marlex 6050, a polyethylene having a density of 0.96 and a melt index of 5.0; Marlex 5003, a polyethylene having a density of 0.95 and a melt index of 0.3; Marlex 5012, a polyethylene having a density of 0.95 and a melt index of 1.2; Marlex 5040, a polyethylene having a density of 0.95 and a melt index of 4.0; Avisun 1044, a polypropylene having a density of between 0.905 to 0.915, and a melt index of 2.5; Escon 103, a polypropylene having a melt index at 230° C. of 1.5; Escon 104, a polypropylene having a melt index at 230° C. of 3.5; and Escon 105, a polypropylene having a melt index at 230° C. of 5.5.

Examples of polyurethane materials which have been used in the present invention include Estane 5740X1, Estane 5740X2 and Estane 5740X7. The properties of the Estane resins are set forth below:

PHYSICAL PROPERTIES OF ESTANE RESINS

| Property | Estane 5740X1 | Estane 5740X2 | Estane 5740X7 | ASTM No. |
| --- | --- | --- | --- | --- |
| Specific gravity | 1.20 | 1.20 | 1.20 | |
| Hardness, Shore: | | | | |
| A Scale | 88 | 70 | 96 | |
| D Scale | 35 | 23 | 49 | |
| Stress-strain properties | | | | D-412 |
| Tensile strength (p.s.i.) | 5,840 | 5,000 | 5,840 | |
| 300% Modulus (p.s.i.) | 1,240 | 420 | 2,800 | |
| Ultimate elongation (percent) | 540 | 720 | 490 | |
| Abrasion resistance, B. F. Goodrich Pico Abrasion Index [1] | 360 | 125 | 110 | |
| Taber, CS17 wheels, 1,000 gm./wheel, 5,000 revolutions (gram loss) | 0.0025 | 0.1515 | 0.0023 | |
| National Bureau of Standards, Method 14111, Federal Test Method Std. 601 (percent of standard) | 180 | | 225 | |
| Gehman low-temperature, freeze point (° C.) | −31 | −27 | −17 | |
| Compression set | | | | D-395 |
| percent at 25° C./22 hours | 39 | 42 | 31 | |
| percent at 70° C./22 hours | 87 | 79 | 91 | |
| Izod impact strength (ft.-lb./in. Notch) | | | | D-256 |
| at −60° F | 0.67 | | | |
| at −17° F | 2.20 | | | |
| M.V.T., Film | | | | E-96 |
| (gms./100 in.²/24 hours) | 26.3 | | | |

[1] Natural rubber abrasion equal to 100 on the Pico Index.

In order to illustrate the present invention, there is set forth hereinafter by way of example, and not by way of limitation, the following examples. In each example the polyolefin was first melted in a Banbury mixer, maintained at the temperature indicated in the example, and then polyurethane pellets were added to the molten polyolefin. Blending was achieved in the Banbury mixer during the time period of approximately three minutes, with the polyurethane entering into solution. No solvents of any kind were added.

The resultant composition in each instance could be flexed and compression molded without striation or checking. Thus, the resultant composition in each instance constituted a translucent solid.

*Example I*

Alathon 20 was added to a Banbury mixer and melted at a temperature of 225° F. Compositions between the Alathon 20 and Estane 5740X2 were prepared consisting of 95 wt. percent, 90 wt. percent, 85 wt. percent, 80 wt. percent, 75 wt. percent, 70 wt. percent, 65 wt. percent, 60 wt. percent, 55 wt. percent, and 50 wt. percent of Alathon 20 with the remainder in each case consisting of Estane 5740X2.

With each of these compositions a compatible composition was obtained. In particular, within the range of 15 wt. percent to 25 wt. percent of Estane 5740X2, the composition was both resistant to organic solvents, such as gasoline, kerosene, benzene, toluene, and naphtha, in the cold, and was capable of being compression molded and flexed.

*Example II*

Escon 103 was melted in a Banbury mixer, and then 15 wt. percent of Estane 5740X1 was added thereto. The temperature was maintained throughout the melting and blending at about 350° F. The blending was effected for three minutes. The resultant composition possessed excellent resistance to the action of hydrocarbon solvents and could be compression molded. Additional compositions were made using the same procedure with 20 wt. percent and 25 wt. percent of Estane 5740X1. These compositions likewise possessed superior resistance to hydrocarbon solvents and could be compression molded.

*Example III*

Marlex 6002 was melted in a Banbury mixer at 270° F., and Estane 5740X2 was added to it at this temperature and the mixing continued for a period of three minutes. Compositions were made each consisting of 15 wt. percent, 20 wt. percent, and 25 wt. percent of the Estane 5740X2. In each case, the compositions possessed superior resistance to hydrocarbon solvents and could be compression molded.

*Example IV*

DPD-6169 was melted in a Banbury mixer at 225° F., and Estane 5740X7 was added thereto at this temperature. Compositions consisting of 5 wt. percent, 10 wt. percent, 15 wt. percent, 20 wt. percent, 25 wt. percent, 30 wt. percent, 35 wt. percent, 40 wt. percent, 45 wt. percent, and 50 wt. percent of Estane 5740X7 were prepared. In each instance the composition could be compression molded and flexed without striation and checking. The compositions having from 15 to 25 wt. percent were tested for resistance to hydrocarbon solvents and compression moldability and were found to possess superior resistance to hydrocarbon solvents and to be readily compression molded.

*Example V*

A mixture of 50 wt. percent of Alathon 20 and 50 wt. percent of DPD-6169 were melted in a Banbury mixer at 225° F., and Estane 5740X2 were added to the mixture at this temperature. Compositions containing 5 wt. percent, 10 wt. percent, 15 wt. percent, 20 wt. percent, 25 wt. percent, 30 wt. percent, 35 wt. percent, 40 wt. percent, 45 wt. percent, and 50 wt. percent of Estane 5740X2 were prepared. Those having between 15 to 25 wt. percent were tested for resistance to hydrocarbon solvents and for compression moldability and were found to possess superior resistance to hydrocarbon solvents and to be compression moldable. Each of the compositions throughout the entire range were found to be campatible without striation and checking.

The present invention may be embodied in other specific forms without departing from the spirit or essential attributes thereof and, accordingly, reference should be made to the appended claims, rather than to the foregoing specification as indicating the scope of the invention.

I claim:

1. A molded article formed from a compatible polymer composition consisting essentially of a homogeneous mixture of 85 to 75 weight percent of a polyolefin selected from the group consisting of polyethylene, polypropylene, polyethylene copolymer having a major weight percentage of polyethylene, and mixtures thereof, and from 15 to 25 weight percent of polyurethane, which composition possesses excellent resistance characteristics in the cold state to hydrocarbon solvents, and may be readily compression molded.

2. A molded article in accordance with claim 1 in which the polyolefin is polyethylene.

3. A molded article in accordance with claim 1 in which the polyolefin is polypropylene.

4. A molded article in accordance with claim 1 in which the polyolefin is a polyethylene copolymer having a major weight percent of polyethylene.

References Cited by the Examiner

UNITED STATES PATENTS

| | | | |
|---|---|---|---|
| 2,955,098 | 10/1960 | Last | 260—859 |
| 3,027,343 | 3/1962 | Kane | 260—859 |
| 3,170,004 | 2/1965 | Farago | 260—859 |

MURRAY TILLMAN, *Primary Examiner.*

J. C. BLEUTGE, *Assistant Examiner.*